United States Patent [19]
Yamamoto

[11] Patent Number: 6,163,515
[45] Date of Patent: Dec. 19, 2000

[54] OPTICAL DISK WRITING CONTROL DEVICE

[75] Inventor: Kazutaka Yamamoto, Kanagawa, Japan

[73] Assignee: Ricoh Company, Ltd., Tokyo, Japan

[21] Appl. No.: 09/049,129

[22] Filed: Mar. 27, 1998

[30] Foreign Application Priority Data

Mar. 31, 1997 [JP] Japan .................................. 9-080769

[51] Int. Cl.[7] ...................................................... G11B 7/00
[52] U.S. Cl. .................. 369/58; 369/48; 369/59
[58] Field of Search ................................ 369/47, 48, 49, 369/50, 54, 58, 59, 60.1

[56] References Cited

U.S. PATENT DOCUMENTS

| | | | |
|---|---|---|---|
| 5,177,720 | 1/1993 | Kondo . | |
| 5,870,366 | 2/1999 | Sako ........................................... | 369/59 |

FOREIGN PATENT DOCUMENTS

0421871 A2   4/1991   European Pat. Off. .
0550266 A2   7/1993   European Pat. Off. .
195 22 326  12/1995   Germany .

OTHER PUBLICATIONS

J.R. Watkinson, "Subcodes explained, How control signals are combined with and separated from audio samples"; Electronics & Wireless World Sep. 1986.

Patent Abstract of Japan: 09091869 Sony Corp., vol. 097, No. 008, Aug. 29, 1997.

Primary Examiner—Muhammad Edun
Attorney, Agent, or Firm—Dickstein Shapiro Morin & Oshinsky LLP

[57] ABSTRACT

An optical disk writing control device for writing subcode Q data for each block on an optical disk, includes a subcode Q data register which stores subcode Q data set by a CPU, and a control unit which reads the subcode Q data from said subcode Q register, performs a predetermined calculation on predetermined data of the subcode Q data for each block, and outputs the predetermined data which has undergone the predetermined calculation and the remaining data of the subcode Q data for each block.

16 Claims, 17 Drawing Sheets

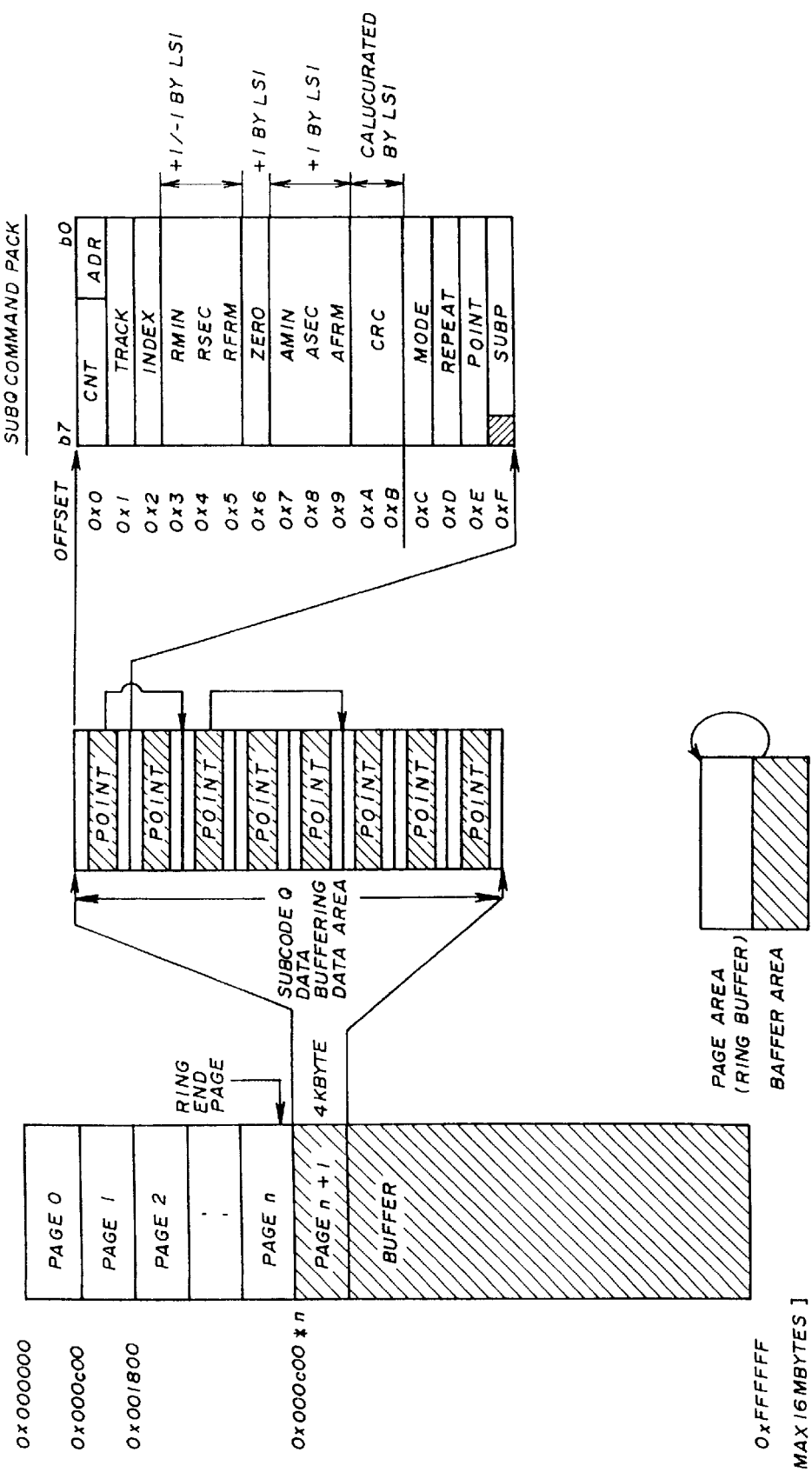

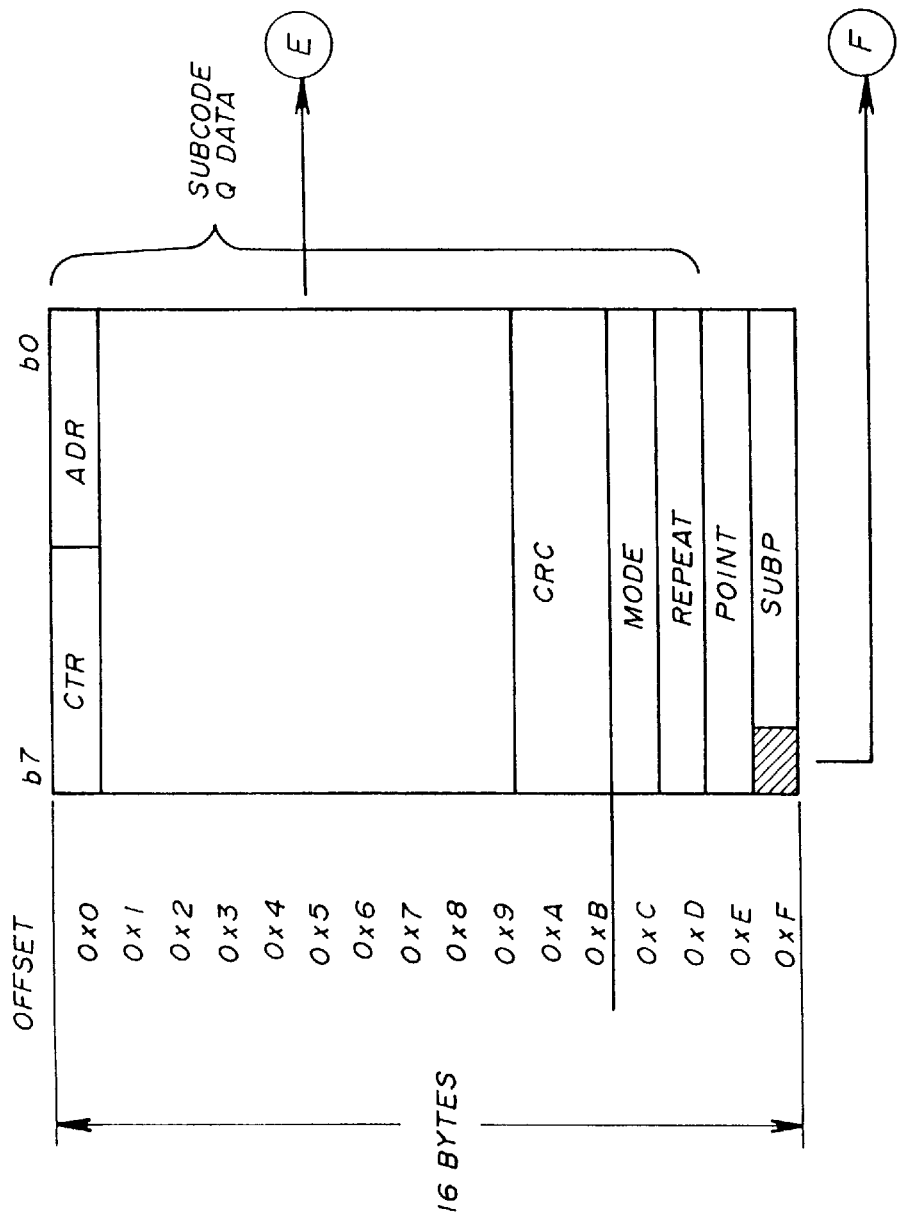

FIG. 8

| MODE [W] | BIT7 | BIT6 | BIT5 | BIT4 | BIT3 | BIT2 | BIT1 | BIT0 |
|---|---|---|---|---|---|---|---|---|
| OFFSET 0xC | RTSRC | RTINCDEC | ZSRC | ATSRC | LOAD | CPYTGL | | |

FIG. 9

| ADR | OUTPUT TO PARALLEL-TO-SERIAL CONVERTER | | | NOTE |
|---|---|---|---|---|
| | AMIN | ASEC | ATIME COUNTER [BLOCK] | |
| 0x2 OR 0x3 | ATIME COUNTER [MIN] | ATIME COUNTER [SEC] | ATIME COUNTER [BLOCK] | |
| OTHERS | | | | |

FIG. 10

| OFFSET | BIT 7 | BIT 6 | BIT 5 | BIT 4 | BIT 3 | BIT 2 | BIT 1 | BIT 0 |
|---|---|---|---|---|---|---|---|---|
| 0 x D | | | | REPEAT | | | | |

REPEAT ( BUFFER OFFSET : 0 x D ) [W]

FIG. 11

SET VALUE

| REPEAT | NUMBER OF REPETITION | SUPPLEMENT |
|---|---|---|
| 0x00 | - | NOT ALLOWED |
| 0x01 | 1 | |
| 0x02 | 2 | |
| ... | ... | |
| 0xFE | 254 | |
| 0xFF | 255 | |

FIG. 12

POINT (BUFFER OFFSET : 0xE) [W]

| OFFSET | BIT 7 | BIT 6 | BIT 5 | BIT 4 | BIT 3 | BIT 2 | BIT 1 | BIT 0 |
|---|---|---|---|---|---|---|---|---|
| 0xE | | | | POINT | | | | |

FIG. 13

| BUFFER ADDRESS | | | | |
|---|---|---|---|---|
| 23 | 1211 | | 4 3 | 0 |
| RING END | x 0xc00 | POINT | 0 0 0 | 0 |

FIG. 14

SUBP (BUFFER OFFSET : 0xF) [W]

| OFFSET | BIT 7 | BIT 6 | BIT 5 | BIT 4 | BIT 3 | BIT 2 | BIT 1 | BIT 0 |
|--------|-------|-------|-------|-------|-------|-------|-------|-------|
| 0xF    | P     |       |       |       |       |       |       |       |

OPTICAL DISK WRITING CONTROL DEVICE

BACKGROUND OF THE INVENTION

1. Field of the Invention

The present invention relates to an optical disk writing control device for writing data on an optical disk such as a CD (CD-R) on which data can be written, a CD (CD-RW) (data of which can be rewritten) or the like.

2. Description of the Related Art

When various main channel data such as voice, images, letters and so forth is recorded on an optical disk such as a CD-R, CD-RW or the like, it is necessary to record various control data, which is used for data reading and so forth, on the optical disk.

The control data includes 8 items of sub-channel data, P through W. A subcode Q data includes time information for a track in which a set of the main channel data is recorded, a TOC (Table Of Contents) of the main channel data and so forth.

A format of the sub-channel data will now be described with reference to FIGS. 1A, 1B and 1C. As shown in FIG. 1A, each block, as a data unit of the sub-channel data, includes 98 EFM (Eight to Fourteen Modulation) frames. When a speed of writing data on the optical disk is a single speed mode, the speed of writing the frames is 75 frames/second. As shown in FIG. 1B, each EFM frame includes 8-bit subcode information. These bits are referred to as P, Q, R, S, T, U, V and W, respectively. FIG. 1B shows an arrangement obtained from vertically arranging the sub-channel data of one block of the respective EFM frames. FIG. 1C shows an arrangement obtained from horizontally arranging the subcode Q data of the sub-channel data of the respective EFM frames. As shown in FIG. 1C, a data unit of the subcode Q data includes 98 bits. The front two bits of sub-channel data of the EFM frames are bits for synchronization. The remaining 96 bits indicate effective information.

These 96 bits are divided into 12 bytes, and, in a typical model, these bytes are allocated to data, referred to as 'CTL, ADR', 'TRACK', 'INDEX', 'RMIN', 'RSEC', 'RFRM', 'ZERO', 'AMIN', 'ASEC', 'AFRM' and 'CRC', respectively.

'CTR' represents the type of the corresponding track (for example, a tune of a music CD) of the main channel data, 'ADR' represents the type of the subcode Q data, 'TRACK' represents the track number of a corresponding track of the main channel data, 'INDEX' represents numbers indicating, respectively, predetermined points in the corresponding track of the main channel data, 'RMIN', 'RSEC' and 'RFRM' represent relative time information for the corresponding track of the main channel data, 'ZERO' represents a fixed value '00H', 'AMIN', 'ASEC' and 'AFRM' represent absolute time information for the main channel data, and 'CRC' is data of an error detection code.

In the optical disk writing control device for writing data on an optical disk such as a CD-R, a CD-RW or the like (hereinafter, referred to as a 'controller IC for the CD-R/RW') in the related art, when the subcode Q data is written on the optical disk, main data of the subcode Q data set by a CPU is output to a writing side, approximately as it is. Accordingly, the functions of the controller IC for the CD-R/RW are very simple.

First, every time data is written on the optical disk for each block (every 13.3 ms in the case where the data writing speed is the single speed mode, for example), the CPU connected with the controller IC for the CD-R/RW generates the main data of the subcode Q data to be written on the optical disk, and sets the main data of the subcode Q data in registers of the controller IC for the CD-R/RW. Then, the controller IC for the CD-R/RW processes the main data of the subcode Q data in a predetermined manner, and writes the main data of the subcode Q data on the optical disk.

With reference to FIG. 2, writing of the subcode Q data through the controller IC for the CD-R/RW will now be described.

First, when data is written on the optical disk, the CPU generates the main data of the subcode Q data, 'CTL, ADR', 'TRACK', 'INDEX', 'RMIN', 'RSEC', 'RFRM', 'ZERO', 'AMIN', 'ASEC', 'AFRM', and sets the main data of the subcode Q data in the registers (hereinafter, referred to as 'Sys Con registers') of a Sys Con interface of the controller IC for the CD-R/RW.

The controller IC for the CD-R/RW loads the main data of the subcode Q data in a parallel-to-serial converter, calculates 'CRC', adds 'CRC' at the end of the main data of the subcode Q data, adds 'S0' and 'S1' at the forefront of the main data of the subcode Q data, and sends the thus-obtained subcode Q data to the writing side.

At this time, 'S0', 'S1' and 'CRC' of the subcode Q data are automatically generated. However, for the main data of the subcode Q data, 'CTL, ADR', 'TRACK', 'INDEX', 'RMIN', 'RSEC', 'RFRM', 'ZERO', 'AMIN', 'ASEC', 'AFRM', only the contents set by the CPU are written as they are.

This is because the subcode Q data is written in some format modes specified by ADR in a mixed manner, and also, when the subcode Q data is written, the TOC having a complicated data arrangement may be handled. Therefore, setting of the main data of the subcode Q data is performed by the CPU in the related art.

On the other hand, when data is written in the optical disk, the CPU calculates the time information which monotonically increases for each block (every 13.3 ms in the case where the data writing speed is the single speed mode, for example), and sets the main data of the subcode Q data, 'CTL, ADR', 'TRACK', 'INDEX', 'RMIN', 'RSEC', 'RFRM', 'ZERO', 'AMIN', 'ASEC', 'AFRM' (total 10 bytes of data) in the Sys Con registers. Accordingly, a heavy load of data processing is borne by the CPU.

For example, the CPU calculates the time information in the binary-coded decimal (BCD) system, and therefore, the CPU bears a considerable load for monotonic increase/decrease calculations.

Further, when data is written on the optical disk in, for example, the single speed mode, it is necessary to write the main data of the subcode Q data, 'CTL, ADR', 'TRACK', 'INDEX', 'RMIN', 'RSEC', 'RFRM', 'ZERO', 'AMIN', 'ASEC', 'AFRM', within the writing time of '13.3 ms'.

Thus, the CPU needs to set the 10 bytes of the main data of the subcode Q data in the Sys Con registers of the controller IC for the CD-R/RW every 13.3 ms.

Further, the CPU needs to set the 10 bytes the main data of the subcode Q data in the Sys Con registers of the controller IC for the CD-R/RW every 6.67 ms when the data writing speed uses the double speed mode, every 3.33 ms when the data writing speed is 4×, and every 1.67 ms when the data writing speed is 8×.

When the speed of writing data on the optical disk is increased as mentioned above, the CPU needs to perform, for each block (every 13.3 ms in the case where the data writing speed is the single speed mode, for example), simple calculation of the time information, generate the main data of the subcode Q data, and set the generated data in the Sys Con registers of the controller IC for the CD-R/RW, at high speed. Thus, the data processing load of the CPU increases.

For example, when the speed of writing data on the optical disk is the single speed mode, even a low-speed CPU, can performs the above-described operations including setting of the main data of the subcode Q data in the Sys Con registers without delay. However, when the speed of writing data on the optical disk is 8× speed, a low-speed CPU cannot perform calculation of the time information for each block (every 1.67 ms), generation of the main data of the subcode Q data every 1.67 ms, and setting of the 10 bytes of data in the Sys Con registers without delay.

By using a high-speed CPU, high-speed data writing can be performed. However, this increases cost. Further, when a high-speed CPU is used, it is necessary to increase the bus width. Accordingly, in view of layout, miniaturization of the system becomes difficult.

SUMMARY OF THE INVENTION

The present invention has been devised in consideration of the above-mentioned points, and an object of the present invention is to decrease the data processing load of the CPU when the subcode Q data is written on the optical disk such as a CD-R, a CD-RW, or the like.

An optical disk writing control device, according to the present invention, for writing subcode Q data for each block (every 13.3 ms in the case where the data writing speed is the single speed mode, for example) on an optical disk, comprises:

a subcode Q data storing unit for storing subcode Q data set by a CPU; and a control unit for reading the subcode Q data from the subcode Q data storing unit, performing a predetermined calculation on predetermined data of the subcode Q data for each block (every 13.3 ms in the case where the data writing speed is the single speed mode, for example), and outputting, for each block (every 13.3 ms in the case where the data writing speed is the single speed mode, for example), the predetermined data which has undergone the predetermined calculation and the remaining data of the subcode Q data.

In this arrangement, when the subcode Q data is written on the optical disk, the subcode Q data set by the CPU is stored, the stored subcode Q data is read, the predetermined calculation is performed on the predetermined data of the subcode Q data, and the predetermined data which has undergone the predetermined calculation and the remaining data of the subcode Q data is output for each block (every 13.3 ms in the case where the data writing speed is the single speed mode, for example). Thereby, the CPU does not need to set the subcode Q data in real time for each block (every 13.3 ms in the case where the data writing speed is the single speed mode, for example), the number of setting of the subcode Q data by the CPU can be reduced, and thus, the data processing load of the CPU can be reduced.

The control unit may comprise:

a track relative time incrementing/decrementing and outputting unit for incrementing or decrementing, and outputting track relative time information of the subcode Q data;

a ZERO incrementing unit for incrementing and outputting ZERO data of the subcode Q data; and a through-track absolute time incrementing/decrementing and outputting unit for incrementing or decrementing, and outputting through-track absolute time information of the subcode Q data.

Thereby, data such as the time information which monotonically increases or decreases can be calculated by hardware. As a result, the data processing load of the CPU can be reduced.

The control unit may have a function of selecting whether the subcode Q data is output as it is or the subcode Q data is output after the predetermined calculation is performed on the predetermined data of the subcode Q data.

Thereby, it is possible to flexibly set formats or patterns of the subcode Q data. It is possible that the data, which does not need to be updated, of the subcode Q data is output to the parallel-to-serial converter as it is. A lot of the time information generated by the hardware monotonically increases/decreases and the increasing/decreasing patterns thereof do not need to be updated. Accordingly, the CPU does not need to calculate such time information for every increase/decrease timing. Thus, the data processing load of the CPU can be reduced.

The control unit may comprise a temporary storing unit for temporarily storing the subcode Q data read from the subcode Q data storing unit, the subcode Q data stored in said temporary storing unit being read and output for each block (every 13.3 ms in the case where the data writing speed is the single speed mode, for example).

Thereby, it is not necessary to set the subcode Q data with strict time control by the CPU in the subcode Q data storing unit. As a result, a CPU having a low-speed data processing capability can be used for programming and the cost can be reduced.

The control unit may have a function of determining the timing of reading the subcode Q data from the subcode Q data storing unit and storing the read subcode Q data in the temporary storing unit.

In this arrangement, the timing of reading the subcode Q data from the subcode Q data storing unit and storing the read subcode Q data in the temporary storing unit is determined by hardware (repeat counter). Thereby, the CPU does not need to determine the timing of reading the subcode Q data from the subcode Q data storing unit and storing the read subcode Q data in the temporary storing unit.

The control unit may include the functions of storing the subcode Q data set by the CPU in an external memory, reading the subcode Q data from the external memory occasionally, and storing the read subcode Q data in the subcode Q data storing unit.

Thereby, when a complicated pattern of data such as the TOC is written on the optical disk, the CPU does not need to set the data in real time for each block (every 13.3 ms in the case where the data writing speed is the single speed mode, for example) when the data is written on the optical disk, as a result of previously setting the pattern of data in the external memory.

A portion of a buffer RAM for host data may be used as the external memory. Thereby, it is possible to use an inexpensive DRAM having a large storage capacity. As a result, the area of the IC chip can be reduced and the cost for producing the IC chip can be reduced.

An optical disk writing control device, according to another aspect of the present invention, for writing subcode Q data for each block (every 13.3 Ms in the case where the data writing speed is the single speed mode, for example) on an optical disk, comprises:

a temporary storing unit for temporarily storing the subcode Q data set by a CPU; and a control unit for reading the subcode Q data from the temporarily storing means and outputting the thus-read subcode Q data for each block (every 13.3 ms in the case where the data writing speed is the single speed mode, for example).

Thereby, the CPU does not need to set the subcode Q data in real time for each block (every 13.3 ms in the case where the data writing speed is the single speed mode, for example), the number of setting of the subcode Q data by the CPU can be reduced, and thus, the data processing load of the CPU can be reduced.

Other objects and further features of the present invention will become more apparent from the following detailed description when read in conjunction with the accompanying drawings.

BRIEF DESCRIPTION OF THE DRAWINGS

FIG. 6 illustrate a format of a buffer RAM connected with the controller IC for the CD-R/RW shown in FIGS. 1A, 1B and 1C, and a format of a subQ command pack stored in a storage area of the buffer RAM.

FIGS. 7A, 7B and 7C illustrate production of a subcode or sub-channel data from the subQ command pack;

FIG. 8 illustrate mode information used in the controller IC or the CD-R/RW shown in FIGS. 1A, 1B and 1C;

FIG. 9 illustrates source data of 'AMIN', 'ASEC' and 'AFRM' to be loaded in the parallel-to-serial converter when '1' is set in ATSRC of the mode information;

FIG. 10 illustrate repeat information used in the controller IC for the CD-R/RW shown in FIGS. 1A, 1B and 1C;

FIG. 11 shows the relationship between set values of the repeat information and the numbers of repetition;

FIG. 12 illustrate point information used in the controller IC for the CD-R/RW shown in FIGS. 1A, 1B and 1C;

FIG. 13 shows an data arrangement of an address for specifying the subQ command pack; and FIG. 14 illustrate subcode P data used in the controller IC the CD-R/RW shown in FIGS. 1A, 1B and 1C;

DETAILED DESCRIPTIONS OF THE PREFERRED EMBODIMENTS

Embodiments of the present invention will now be specifically described with reference to figures.

Figure 1:
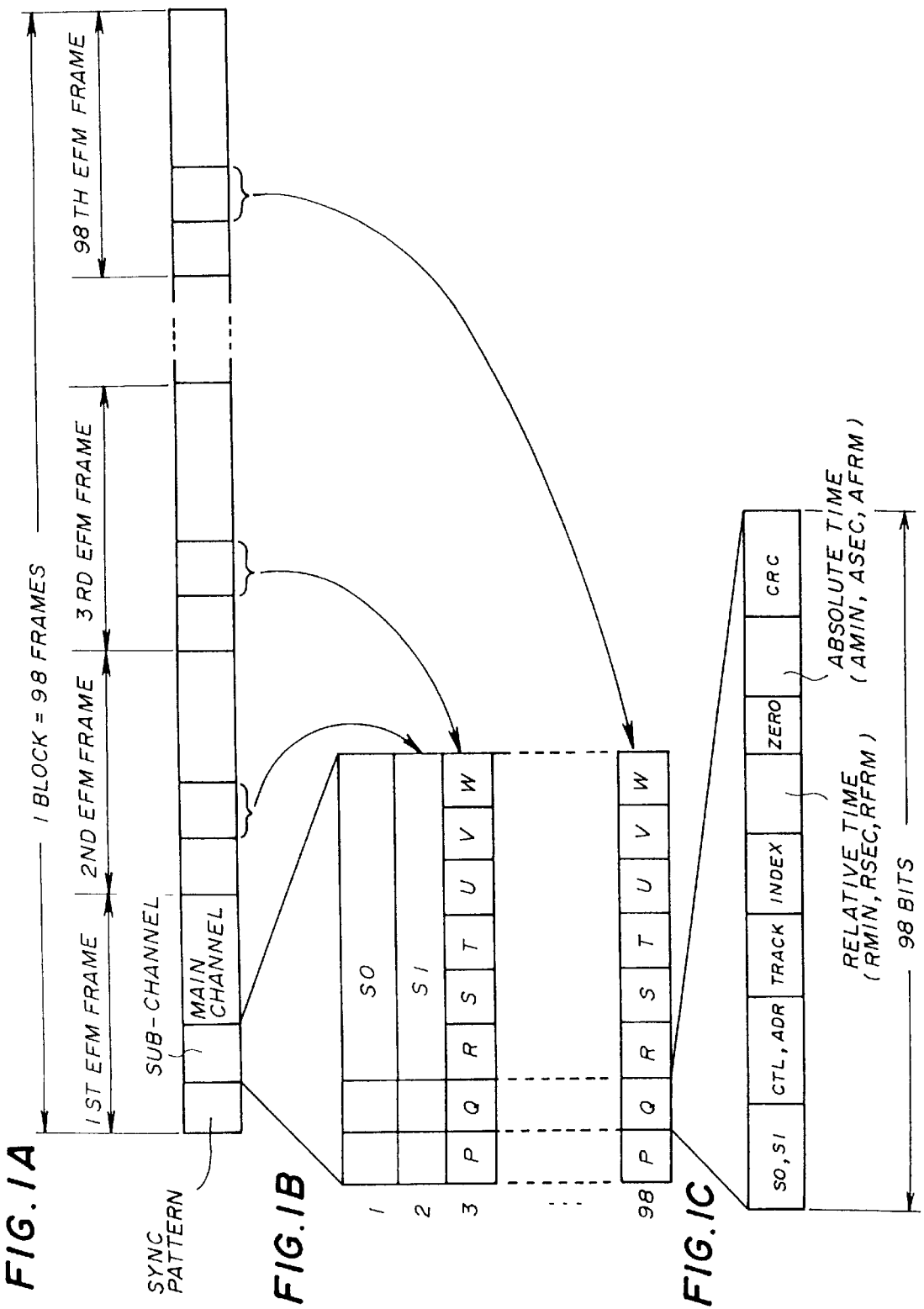
FIGS. 1A, 1B and 1C illustrate an arrangement of data to be written on an optical disk.
Figure 2:
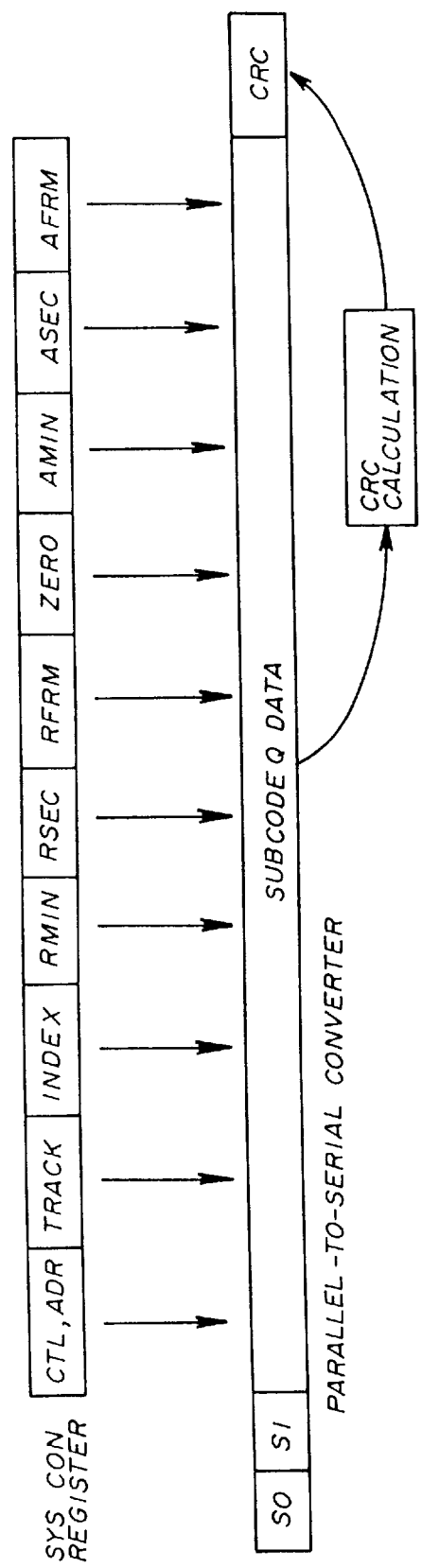
FIG. 2 illustrates loading of subcode Q data in a parallel-to-serial converter in the related art.
Figure 3A:
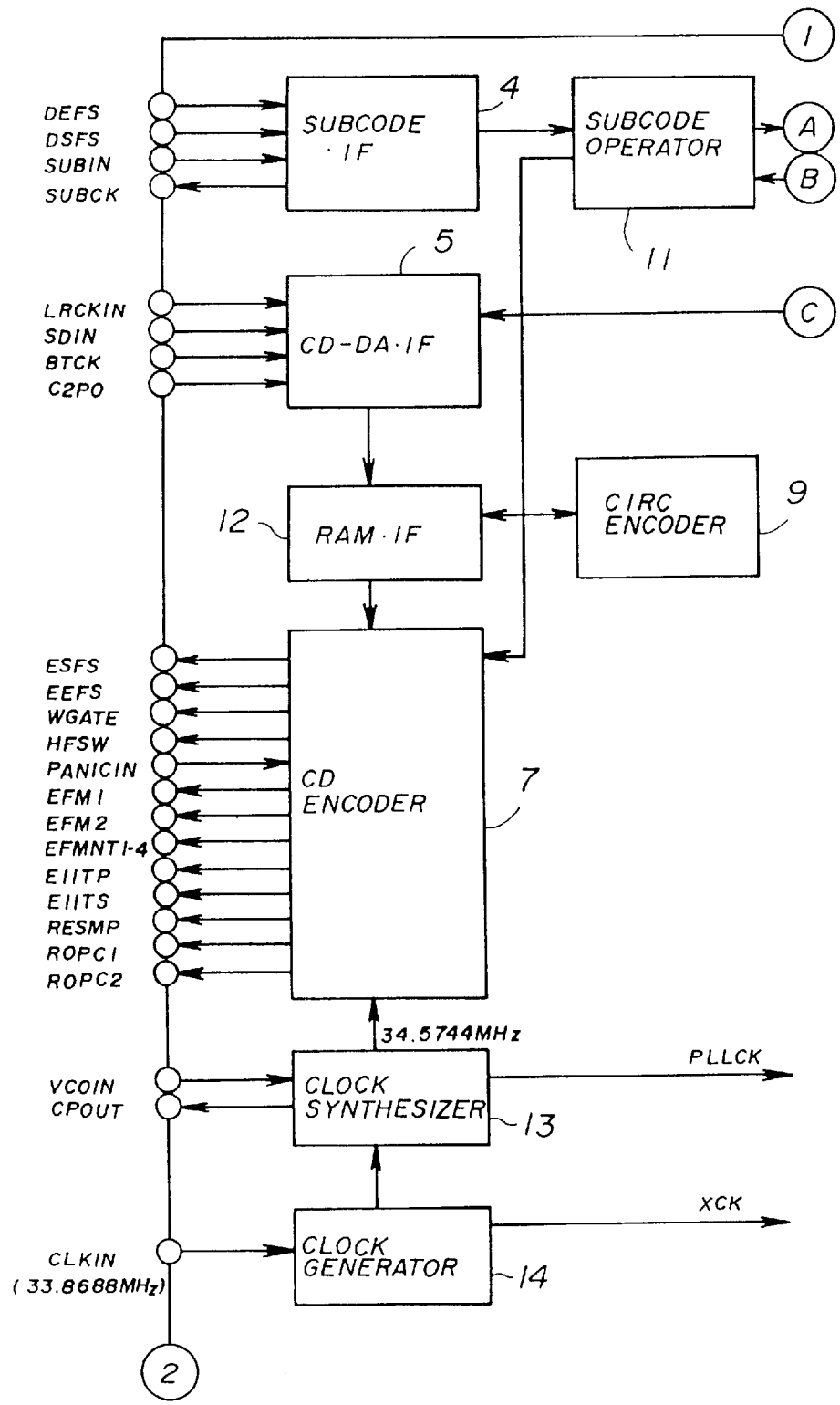
FIGS. 3A, 3B and 3C show a block diagram of a controller IC for a CD-R/RW in one embodiment of an optical disk writing control device of the present invention.
Figure 3B:
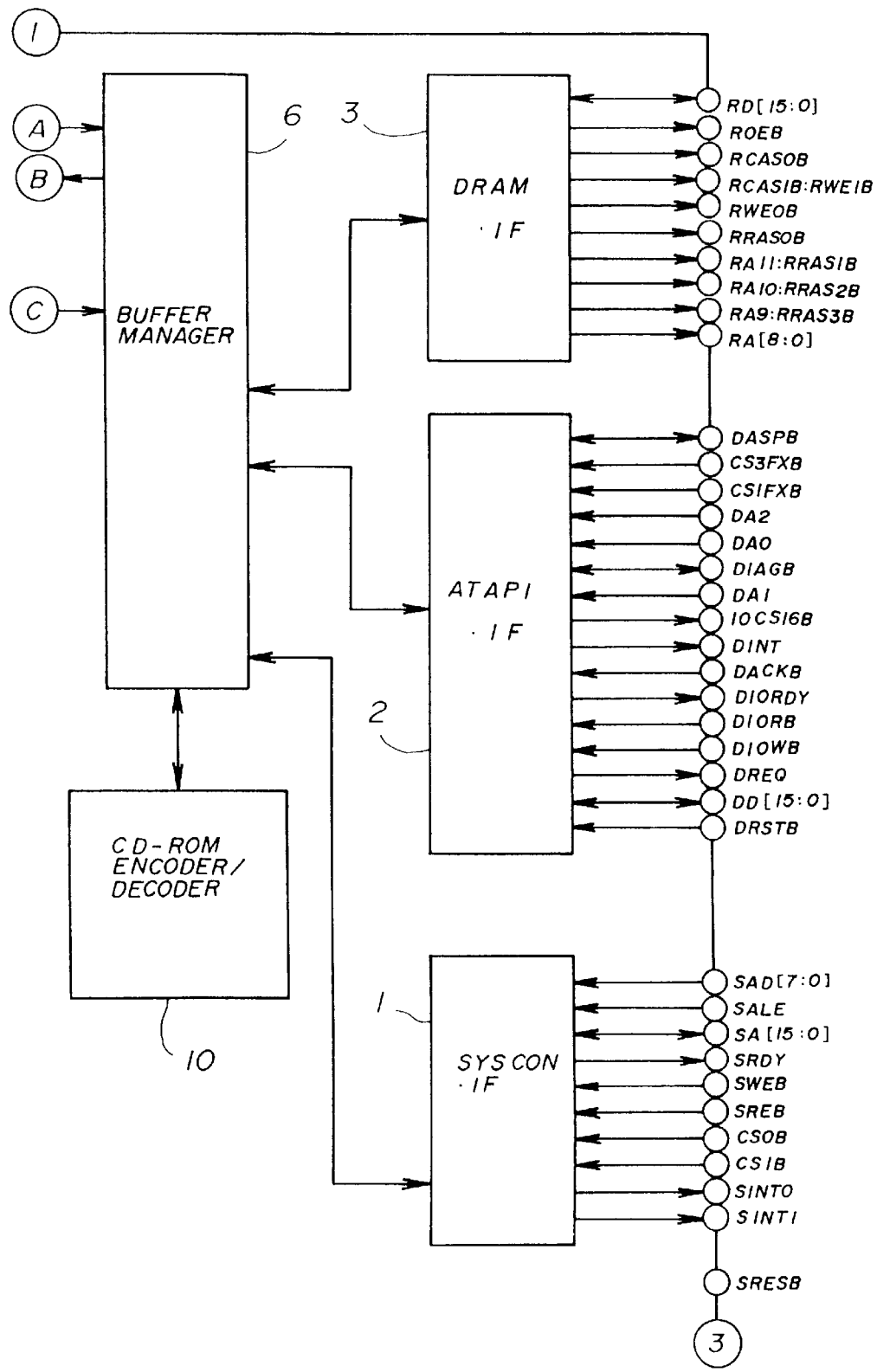
Figure 3C:
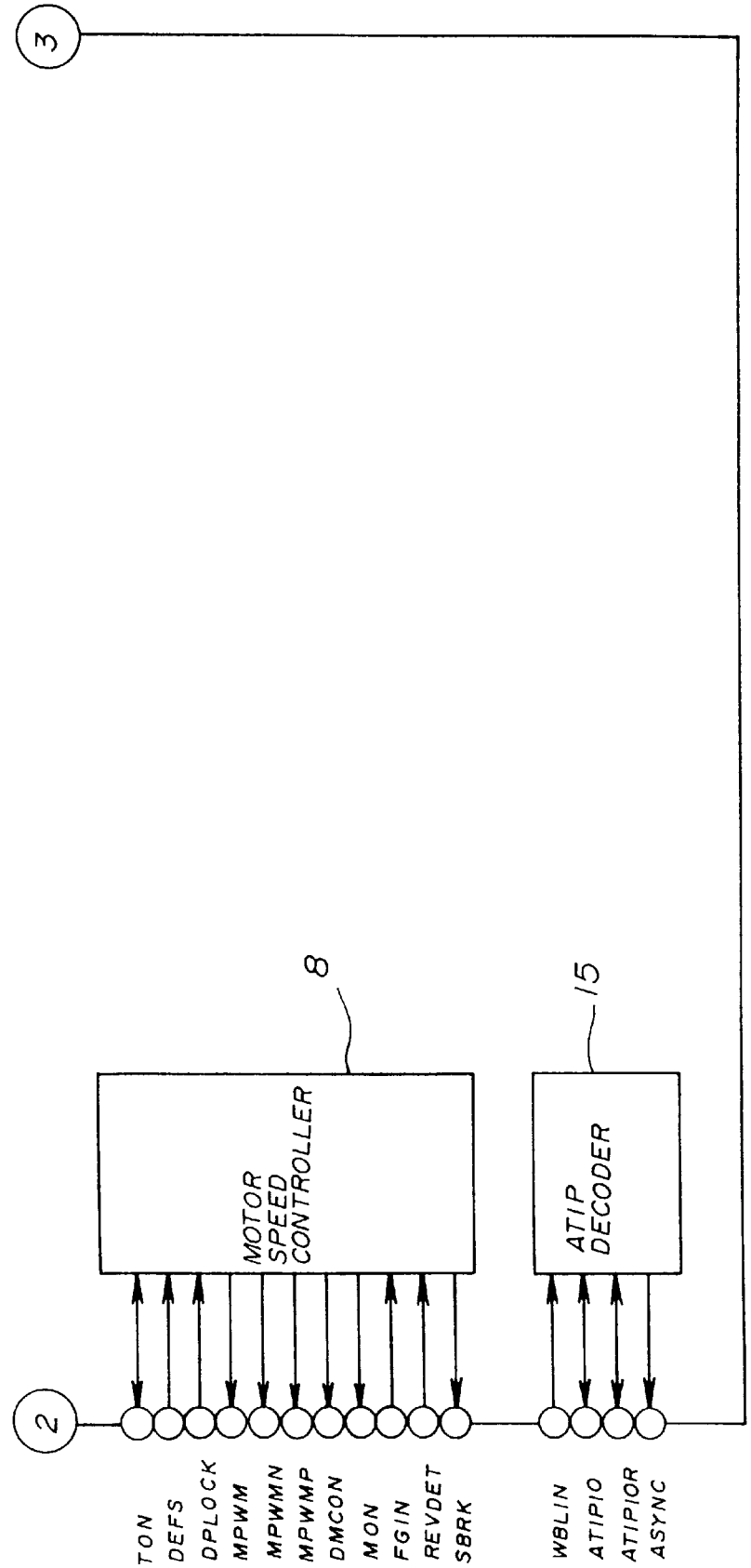

FIGS. 3A, 3B and 3C show a block diagram of a controller IC for a CD-R/RW in one embodiment of an optical disk writing control device according to the present invention. These figures are connected with each other in a manner in which lines are connected as ①—①, ②—② and ③—③, and signal lines are connected as Ⓐ—Ⓐ, Ⓑ—Ⓑ and Ⓒ—Ⓒ.

This controller IC for the CD-R/RW writes, on an optical disk such as a CD-R, a CD-RW or the like, the main channel data supplied by a host, together with the sub-channel data including the subcode Q data for each block (every 13.3 ms in the case where the data writing speed is the single speed mode, for example).

Although the controller IC for the CD-R/RW also reads recorded data from the optical disk, descriptions of the operations therefor will be omitted.

In this controller IC for the CD-R/RW, a Sys Con interface (Sys Con•IF) 1 includes Sys Con registers, which has a CPU connected therewith, and controls the entirety of the IC.

An ATAPI•IF 2 has the host connected therewith, and performs sending to and receiving from the host various commands and data.

A DRAM•IF 3 has a buffer RAM connected therewith, and performs refreshing control of reading from and writing in the buffer RAM data such as subcode Q data and so forth.

A subcode interface (subcode•IF) 4 and a CD-DA•IF 5 have a digital signal processor (DSP) for a CD-ROM connected therewith, and reads the main channel data and the sub-channel data of the CD-ROM.

A buffer manager 6 arbitrates between data transfer from the respective interfaces, that is, the ATAPI•IF 2, the DRAM•IF 3, the subcode•IF 4 and the CD-DA•IF 5, and data request from a CD-ROM encoder/decoder (CD-ROM encoding/decoding processor) 10, and performs reading from and writing in the buffer RAM data such as the subcode Q data and so forth.

A CD encoder 7 has a laser diode driving circuit connected therewith, modulates (EFM) the main channel data and the sub-channel data to be written on the optical disk, and outputs the modulated data.

A motor speed controller 8 has a spindle motor driving circuit connected therewith (the spindle motor driving circuit driving and rotating the optical disk), and performs rotation control of the spindle motor.

A CIRC encoder 9 generates a CD error correction code.

The CD-ROM encoder/decoder 10 generates a CD-ROM error correction code and performs block error correction.

A subcode operator 11 stores the read sub-channel data at a predetermined area of the buffer RAM through the buffer manager 6 and the DRAM•IF 3, combines data stored in the buffer RAM, the data stored in the Sys Con registers and the automatically generated data, and generates the subcode Q data to be written on the optical disk.

The functions of a RAM•IF 12, a clock synthesizer 13, a clock generator 14, an ATIP decoder 15 are well-known and descriptions therefor will be omitted.

Figure 4:
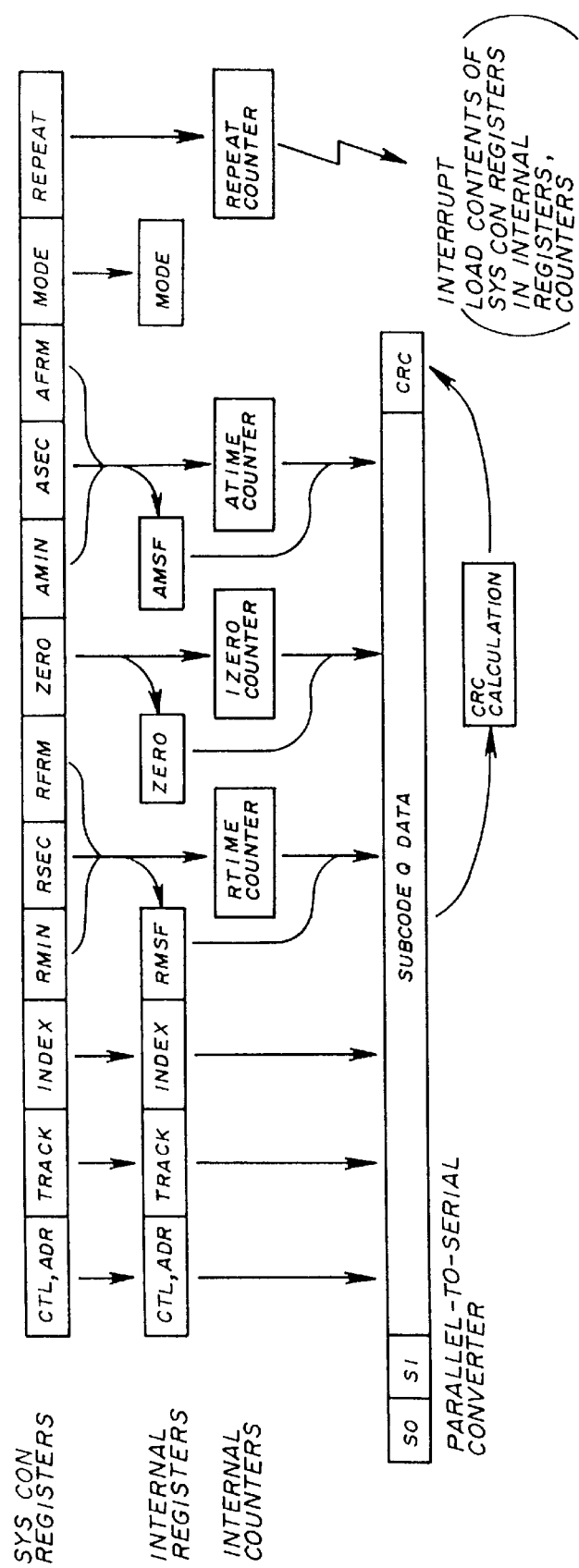
FIG. 4 illustrates generation of subcode Q data by a Sys Con•IF of the controller IC for the CD-R/RW shown in FIGS. 1A, 1B and 1C.

With reference to FIG. 4, generation of the subcode Q data in the controller IC for the CD-R/RW will now be described.

In the controller IC for the CD-R/RW, the main data of the subcode Q data, that is, 'CTL, ADR', 'TRACK', 'INDEX', 'RMIN', 'RSEC', 'RFRM', 'ZERO', 'AMIN', 'ASEC', 'AFRM', is stored in the Sys Con registers of the Sys Con•IF 1.

Further, 'mode information' (MODE) and 'repeat information' (REPEAT) (repeat number) are also stored in the Sys Con registers. The 'mode information' specifies whether the data stored in respective internal registers or the data set in respective counters (described later) is output to a parallel-to-serial converter, specifies setting of initial values in the respective counters, and specifies whether incrementing or decrementing is performed in a counter of the respective counters. The 'repeat information' provides timing (the timing at which the format or pattern of the subcode Q data changes) of generation of an interrupt by which the data of the Sys Con registers is read and then, new data is set in the Sys Con registers by the CPU.

Further, the Sys Con•IF1 includes an 'RTIME counter', an 'IZERO counter' an 'ATIME counter' and a 'repeat counter'. The 'RTIME counter' increments or decrements the data 'RMIN', 'RSEC' and 'RFRM'. The 'IZERO counter' increments the data 'ZERO'. The 'ATIME counter' increments the data 'AMIN', 'ASEC' and 'AFRM'. The 'repeat counter' decrements the data 'REPEAT' (repeat information).

Thus, the 'RTIME counter' acts as an incrementing/decrementing circuit for RTIME (RMIN, RSEC, RFRM). The 'IZERO counter' acts as an incrementing circuit for ZERO. The 'ATIME counter' acts as an incrementing circuit for ATIME (AMIN, ASEC, AFRM). The 'repeat counter' acts as a repeat circuit.

The Sys Con•IF 1 is also provided with internal registers 'CTR, ADR', 'TRACK', 'INDEX' for temporarily storing the items of data 'CTR, ADR', 'TRACK', 'INDEX' stored in the Sys Con registers, respectively, before being output to the parallel-to-serial converter. The Sys Con•IF 1 is also provided with an internal register 'RMSF' for temporarily storing the data 'RMIN', 'RSEC' and 'RFRM' stored in the Sys Con registers, before being output to the parallel-to-serial converter.

The Sys Con•IF 1 is also provided with internal registers 'ZERO' for temporarily storing the data 'ZERO' stored in the Sys Con register, before being output to the parallel-to-serial converter. The Sys Con•IF 1 is also provided with an internal register 'AMSF' for temporarily storing the data 'AMIN', 'ASEC' and 'AFRM' stored in the Sys Con registers, before being output to the parallel-to-serial converter. The Sys Con•IF 1 is also provided with an internal register 'MODE' for storing the 'mode information' (MODE) read from the Sys Con register.

Thus, in the Sys Con•IF 1, a double register circuit is formed including the Sys Con registers and the respective internal registers. Further, in the Sys Con•IF 1, a mode control circuit using the mode information, 'MODE' is formed.

Furthermore, the Sys Con•IF 1, DRAM•IF 3 and so forth form a subcode Q data sequencer circuit, and stores the main data of the subcode Q data, which has been set by the CPU in arbitrary timing, in the buffer RAM connected with the DRAM•IF 3. The Sys Con•IF 1 reads the thus-stored main data of the subcode Q data and stores the read data in the Sys Con registers as a result of the interrupt being generated by the Sys Con•IF 1. Instead, it is also possible to provide an embodiment in which, without using an external memory such as the buffer RAM, the CPU directly sets the main data of the subcode Q data in the Sys Con registers as a result of the interrupt generated by the Sys Con•IF 1.

In the controller IC for the CD-R/RW, the Sys Con•IF 1 reads the main data of the subcode Q data from the Sys Con registers and sets the main data of the subcode Q data in the internal registers, or in the internal registers and counters, reads the mode information 'MODE' from the Sys Con register and sets the mode information in the internal register 'MODE', reads the repeat information 'REPEAT' (repeat number) from the Sys Con register and sets the repeat information in the 'repeat counter', as a result of the interrupt generated by the Sys Con•IF 1. Then, new main data of the subcode Q data, new mode information and new repeat information are set in the Sys Con resisters by the CPU.

The interrupt is generated when the repeat number set in the repeat counter becomes '0' as a result of the repeat counter decrementing, for each block (every 13.3 ms in the case where the data writing speed is the single speed mode, for example), the repeat number set therein. The interrupt causes the data, stored in the Sys Con registers, to be loaded in the internal registers, or in the internal registers and the internal counters. Then, new main data of the subcode Q data, new mode information and new repeat information is set in the Sys Con registers, as mentioned above.

A case, where the mode information 'MODE' set in the internal register 'MODE' indicates that the data set in the Sys Con registers is to be output, will now be described.

As a result of the generation of the interrupt, the data 'CTL, ADR', 'TRACK' and 'INDEX' is read out from the Sys Con registers, is stored in the corresponding internal registers, respectively, and is loaded in the parallel-to-serial converter. Further, the data 'RMIN', 'RSEC' and 'RFRM' is read out from the Sys Con registers, is stored in the internal register 'RMSF', and is loaded in the parallel-to-serial converter.

Furthermore, the data 'ZERO' in the Sys Con register is read, is stored in the internal register 'ZERO', and is loaded in the parallel-to-serial converter. Furthermore, the data 'AMIN', 'ASEC' and 'AFRM' is read out from the Sys Con registers, is stored in the internal register 'AMSF', and is loaded in the parallel-to-serial converter.

Then, the data loaded in the parallel-to-serial converter is converted into serial data, 'S0' and 'S1' are added at the forefront of the serial data, 'CRC' is calculated and added to the end of the serial data, and the thus-obtained total serial data is output for each block (every 13.3 ms in the case where the data writing speed is the single speed mode, for example) until the repeat number set in the repeat counter becomes '0' as a result of the repeat counter decrementing, for each block.

A case, where the mode information 'MODE' set in the internal register 'MODE' indicates that the data set in the Sys Con registers is to be output after calculation is performed on the data, will now be described.

As a result of the generation of the interrupt, the data 'CTL, ADR', 'TRACK' and 'INDEX' is read out from the Sys Con registers, is stored in the corresponding internal registers, and is loaded in the parallel-to-serial converter.

The data 'RMIN', 'RSEC' and 'RFRM' is read out from the Sys Con registers, is set in the 'RTIME counter', and is loaded in the parallel-to-serial converter, after being incremented or decremented for each block (every 13.3 ms in the case where the data writing speed is the single speed mode, for example) through the 'RTIME counter'.

Furthermore, the data 'ZERO' in the Sys Con register is read, is set in the 'IZERO counter', and is loaded in the parallel-to-serial converter, after being incremented for each block through the 'IZERO counter'. Furthermore, the data 'AMIN', 'ASEC' and 'AFRM' is read out from the Sys Con registers, is set in the 'ATIME counter', and is loaded in the parallel-to-serial converter, after being incremented for each block through the 'ATIME counter'.

Then, the data loaded in the parallel-to-serial converter is converted into serial data through the parallel-to-serial converter, 'S0' and 'S1' are added at the forefront of the serial data, 'CRC' is calculated and added to the end of the serial data, and the thus-obtained total serial data is output for each block until the repeat number set in the repeat counter becomes '0' as a result of the repeat counter decrementing, for each block, the repeat number set in the repeat counter.

Thus, the Sys Con•IF 1 is provided with these internal counters for monotonically increasing or decreasing the time information and number. The 'RTIME counter' increments or decrements 'RSEC', 'RMIN' and 'RFRM'. The 'IZERO counter' increments 'ZERO'. The 'ATIME counter' increments 'ASEC', 'AMIN' and 'AFRM'.

The above-mentioned internal registers have functions to ease determination of timing of setting data in the Sys Con registers.

Specifically, when the above-mentioned respective internal registers are not provided, it is necessary that data should be set in the Sys Con registers when the repeat number set in the repeat counter is '1'. Thus, the data setting should be performed with strict time control. By providing the above-mentioned respective internal registers, subsequent data should be set in a time period from loading of the data, stored in the Sys Con registers, in the internal registers to loading of the subsequent data in the internal registers. Thus, the data setting is not required to be performed with strict time control. As the repeat number 'REPEAT' is larger, the data setting is further not required to be performed with strict time control.

Further, by using the mode information and repeat information, different formats or patterns of the subcode Q data can be written in sequence.

Specifically, the mode information specifies whether the data in the Sys Con registers is output to the parallel-to-serial converter as it is, or is output to the parallel-to-serial converter after having calculation performed thereon. Further, the mode information can specify whether incrementing or decrementing is performed therein, and also, can specify initial value setting in each counter. The repeat information can specify the timing at which the format or pattern of the subcode Q data changes.

Figure 5:
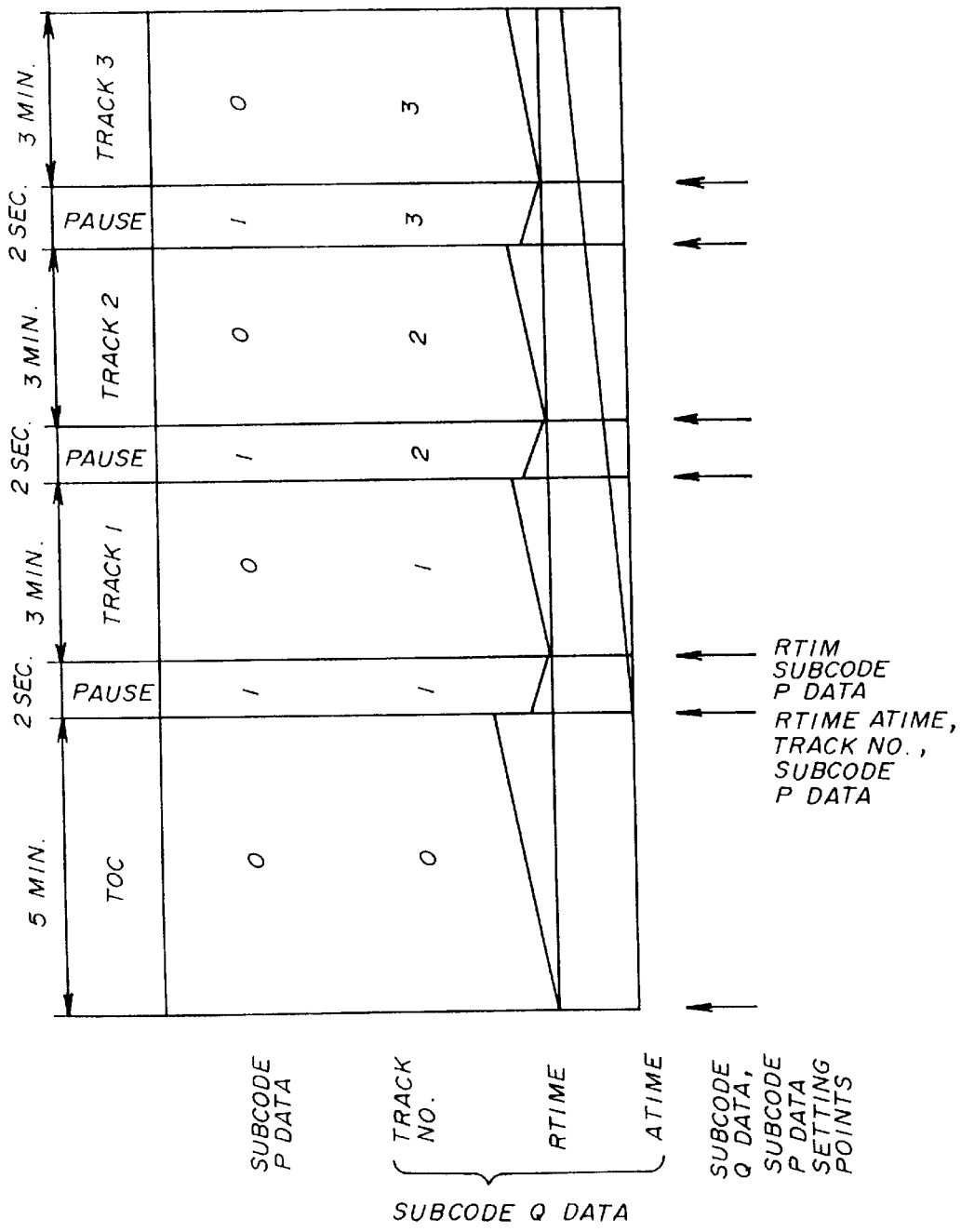
FIG. 5 shows an example of the subcode Q data and so forth written on the optical disk.

FIG. 5 shows an example of the subcode Q data written on the optical disk (in this example, a music CD). In this example, the main channel data includes the TOC, the track 1, track 2 and track 3 (In this example of the music CD, each track corresponds to a tune.). In the figure, each vertical arrow indicates timing of the above-mentioned interrupt. As shown in the figure, the minimum time interval between adjacent interrupts is two seconds. In a time period between each pair of adjacent interrupts, the format or pattern of the subcode Q data does not change.

For example, the CPU needs to set the track No. '1' of the track 1 in the Sys Con register in the time interval (5 minutes for the TOC) between the first and second interrupts, and the second interrupt causes the track No. '1' of the track 1 to be loaded in the parallel-to-serial converter through the internal register and to be written on the optical disk. Then, for each block (every 13.3 ms in the case where the data writing speed is the single speed mode, for example), in the controller IC for the CD-R/RW, the same track No. '1' is read from the internal register and is loaded in the parallel-to-serial converter, thereby, the track No. '1' is written on the optical disk repetitively for each block, until the repeat number set in the repeat counter becomes '0' as a result of the repeat number being decremented for each block. When the repeat number becomes '0', the third interrupt is generated. Thus, during the time period (a pause before the track 1) between the second and third interrupts, the same track No. '1' is repetitively written on the optical disk for each block, as shown in FIG. 5.

With regard to 'RTIME' ('RMIN', 'RSEC' and 'RFRM'), the CPU needs to set an initial value of the 'RTIME', for the pause before the track 1, in the Sys Con register, in the time interval (5 minutes for the TOC) between the first and second interrupts, and the second interrupt causes the initial value of 'RTIME' to be set in the 'RTIME counter'. The initial value set in the 'RTIME counter' is loaded in the parallel-to-serial converter and to be written on the optical disk. Then, for each block, in the controller IC for the CD-R/RW, the value set in the 'RTIME counter' is decremented, the thus-decremented 'RTIME' is read from the 'RTIME' counter, and is loaded in the parallel-to-serial converter, thereby, 'RTIME' (decreasing gradually) is written on the optical disk repetitively for each block, until the repeat number set in the repeat counter becomes '0' as a result of the repeat number being decremented for each block. When the repeat number becomes '0', the third interrupt is generated. Thus, during the time period (the pause before the track 1) between the second and third interrupts, the gradually decreasing 'RTIME' is repetitively written on the optical disk for each block, as shown in FIG. 5.

In the time information 'RTIME' ('RMIN', 'RSEC' and 'RFRM'), 'RMIN' indicates minutes, 'RSEC' indicates seconds and 'RFRM' indicates blocks.

With regard to 'ATIME' ('AMIN', 'ASEC' and 'AFRM'), the CPU needs to set an initial value '0' of the 'ATIME', for the pause before the track 1, in the Sys Con register, in the time interval (5 minutes for the TOC) between the first and second interrupts, and the second interrupt causes the initial value of 'ATIME' to be set in the 'ATIME counter'. The initial value set in the 'ATIME counter' is loaded in the parallel-to-serial converter so as to be written on the optical disk. Then, for each block, in the controller IC for the CD-R/RW, the value set in the 'ATIME counter' is incremented, the thus-incremented 'ATIME' is read from the 'ATIME counter', and is loaded in the parallel-to-serial converter, thereby, 'ATIME' (increasing gradually) is written on the optical disk repetitively for each block, until the repeat number set in the repeat counter becomes '0' as a result of the repeat number being decremented for each block. When the repeat number becomes '0', the third interrupt is generated. Thus, during the time period (the pause before the track 1) between the second and third interrupts, the gradually increasing 'ATIME' is repetitively written on the optical disk for each block, as shown in FIG. 5.

In the time information 'ATIME' ('AMIN', 'ASEC' and 'AFRM'), 'AMIN' indicates minutes, 'ASEC' indicates seconds and 'AFRM' indicates blocks.

Thus, the CPU merely needs to set data in the Sys Con registers in the time interval, which is a minimum of 2 seconds. During the time interval between each pair of adjacent interrupts, the controller IC for the CD-R/RW performs repetitive loading of the same data from the internal registers to the parallel-to-serial converter and repetitive loading of the data after being incremented/decremented. Thereby the processing load of the CPU is considerably reduced.

In a case where the maximum number of the repeat number is not sufficient as to continue the repetition of loading and writing the data for one time interval during which a format or a pattern of the subcode Q data continues, for example, 5 minutes for the TOC, the time interval is divided into divisions so that the maximum number of the repeat number is sufficient as to continue the repetition of loading and writing the data for each division. In such a case, some interrupts are added between the first and second interrupts, for example, in FIG. 5.

The Sys Con registers act as subcode Q data storing means for storing data set by the CPU. The Sys Con•IF 1 acts as control means for reading the thus-stored subcode Q data from the subcode Q data storing means, performing a predetermined calculation on predetermined data of the subcode Q data for each block (every 13.3 ms in the case where the data writing speed is the single speed mode, for example), and outputting the predetermined data which has undergone the predetermined calculation and the remaining data of the subcode Q data for each block.

The Sys Con•IF 1 and 'RTIME counter' act as track relative time incrementing/decrementing and outputting means for incrementing/decrementing the relative time information of the subcode Q data for each block and outputting the resulting information. The Sys Con•IF 1 and 'IZERO counter' act as ZERO incrementing and outputting means for incrementing 'ZERO' of the subcode Q data and outputting the resulting data. The Sys Con•IF 1 and 'ATIME counter' act as absolute time incrementing/decrementing and outputting means for incrementing/decrementing the absolute time information of the subcode Q data, through the tracks, and outputting the resulting information. In the above-described embodiment and the example shown in FIG. 5, 'ATIME' is incremented. However, instead, it is also possible that 'ATIME' is decremented.

The Sys Con•IF 1, by using the mode information 'MODE', acts as selecting means for selecting, whether the subcode Q data is output as it is or the subcode Q data is output after predetermined calculations are performed on predetermined items of the subcode Q data.

The Sys Con•IF 1 and the 'repeat counter' act as means for determining timing of reading the subcode Q data.

The Sys Con•IF 1 and the internal registers 'CTL, ADR', 'TRACK', 'INDEX', 'RMSF', 'ZERO' and 'AMSF' act as means for, when the mode information indicates that the subcode Q data is to be output as it is, temporarily storing the subcode Q data when the same data is written through a plurality of continuous blocks.

When the subcode Q data set by the CPU is stored in an external memory before being set in the Sys Con registers, the Sys Con•IF 1, DRAM•IF 3 and so forth act as means for storing the subcode Q data in the external memory, reading the stored subcode Q data and storing the read subcode Q data in the subcode Q data storing means.

Further, a portion of the above-mentioned buffer RAM is used as the above-mentioned external memory.

With reference to FIG. 6, a format of the buffer RAM connected with the controller IC for the CD-R/RW, and a format of a subQ command pack which is stored in a storage area of the buffer RAM will now be described.

The format of the subQ command pack is a format used when the CPU previously sets the subcode Q data, to be set in the Sys Con register, in the buffer RAM and develops the subcode Q data there. By previously setting the subcode Q data in the format of the subQ command pack in the buffer RAM, the CPU does not need to process the subcode Q data during writing of the data on the optical disk. (In the above-mentioned embodiment in which the CPU directly sets the subcode Q data in the Sys Con registers, the subQ command pack is not needed.)

Because the storage area of the buffer RAM is limited, when complicated information is written on the optical disk, it is possible to add the subQ command pack during the data writing.

It is preferable that a storage area for developing the subQ command pack is set in an area of 4 kilobytes provided subsequent to a ring buffer area for the main channel data of the buffer RAM.

Each subQ command pack includes 16 bytes, and stores, in the offsets '0x0' through 0x9, 0xC and 0xD, 'CTL, ADR', 'TRACK', 'INDEX', 'RMIN', 'RSEC', 'RFRM', 'ZERO', 'AMIN', 'ASEC', 'AFRM', 'MODE' (mode information), 'REPEAT' (repeat information), respectively, as shown in FIG. 6. ('0x' means, in the programming language 'C', that the number or alphabet subsequent thereto indicates a hexadecimal.)

'CRC' is stored in the offsets '0xA' and '0xB' of the subQ command pack and is calculated and set by the controller IC for the CD-R/RW.

Further, 'POINT' (point information) is stored in the offset '0xE' of the subQ command pack and indicates the position of the command pack to be read subsequently. One byte is allocated to the point information, which thus can point to 256 command packs.

In the embodiment, the maximum repeat number is 255 times. However, by setting the point information to point to the position of a certain command pack itself, an endless loop can be provided.

Further, by using the point information, repetition of a predetermined pattern such as a TOC can be flexibly set.

The 'subcode P data' (SUBP) is stored in the offset '0xF' and the bit 7 thereof can be used to specify a setting value of the subcode P data. Accordingly, it is possible to set the subcode P data together with the subcode Q data. Further, it is possible to perform toggling control of the subcode P data.

It is possible to provide an embodiment in which, without using the Sys Con register, the subcode Q data stored in the format of the subQ command pack is directly set in the above-mentioned respective internal registers or in the respective internal registers and counters.

Figure 7A:
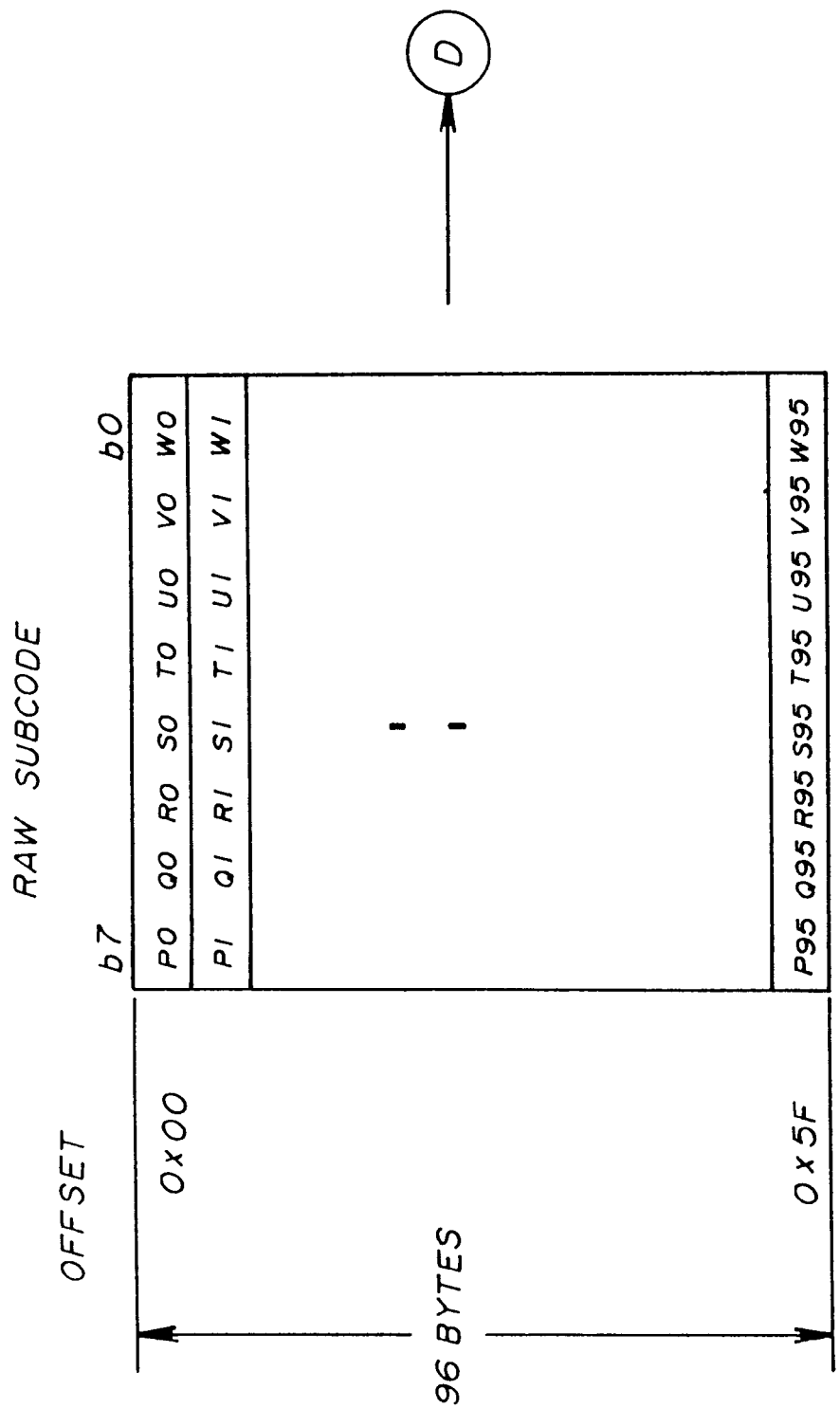
Figure 7C:
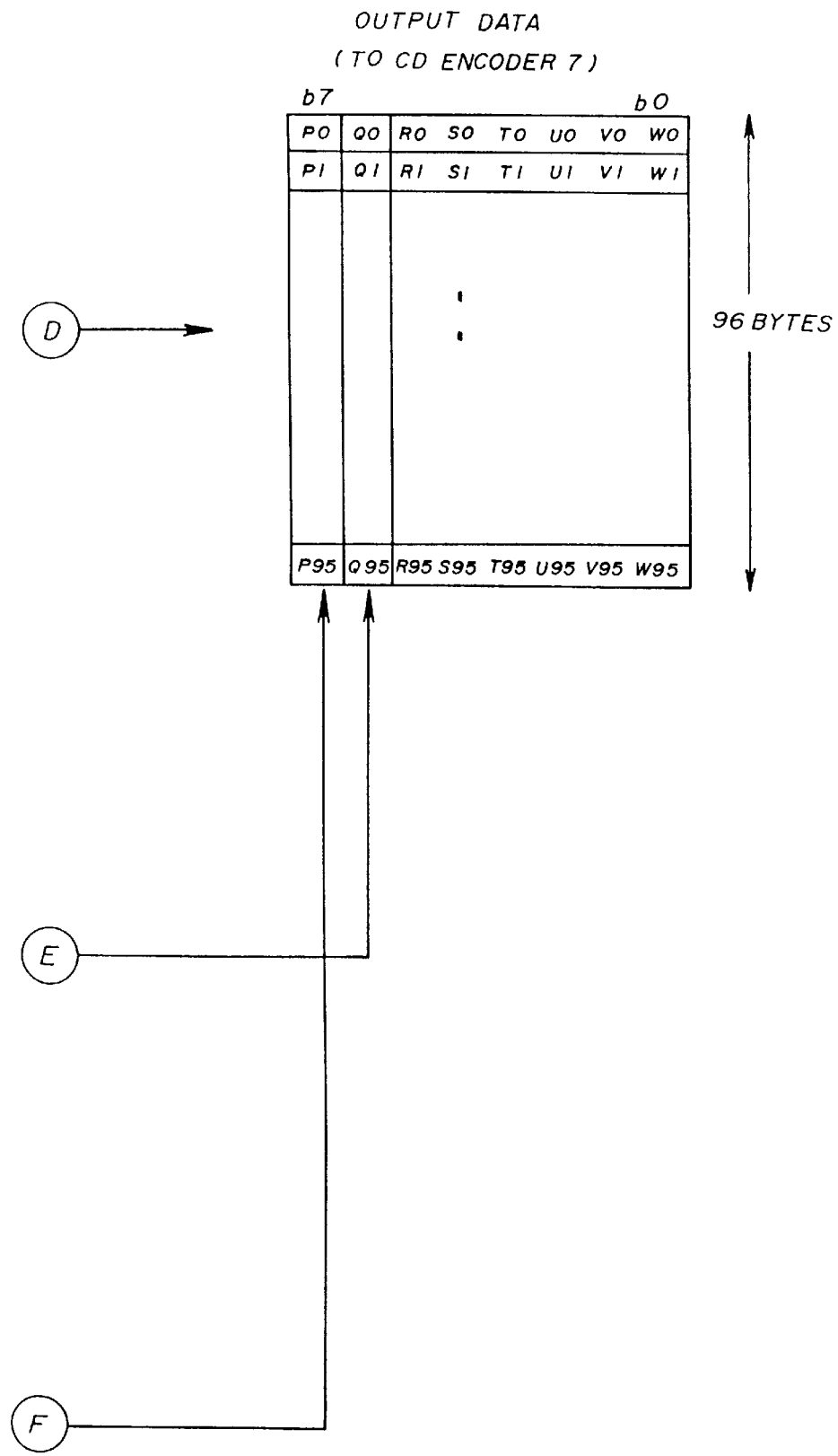

FIGS. 7A, 7B and 7C illustrate production of subcode or the sub-channel data from the data of the subQ command pack. ⓓ, ⓔ and ⓕ are arrows indicating data flow through the figures.

The data of the subQ command pack is combined with a raw subcode, sent from the host, and the resulting subcode is output. It is possible to set the raw subcode to '0'.

With reference to FIG. 8, the mode information 'MODE' will now be described.

Initial values are loaded in the above-mentioned respective internal counters, 'RTIME', 'IZERO' and 'ATIME', respectively, and the values loaded in the above-mentioned respective internal counters, 'RTIME', 'IZERO' and 'ATIME', are incremented '+1' or decremented '−1', in accordance with the following setting of the mode information 'MODE', for each block.

(1) RTSRC (bit 7) [W]

RTSRC specifies source data of 'RMIN', 'RSEC' and 'RFRM' to be loaded in the parallel-to-serial converter.

When '0' is set in LOAD (bit 3), whether '0' or '1' is set in RTSRC, the value set in the 'RTIME counter' is incremented '+1' or decremented '−1' for each block (Whether the value set in the 'RTIME' counter' is incremented or decremented is determined by RTINCDEC (bit 6).).

The value set in the 'RTIME counter' is one of '00:00:00' through '99:59:74' (RMIN:RSEC:RFRM).

When '0' is set in RTSRC, the data of 'RMIN', 'RSEC' and 'RFRM' set in the internal registers is used as data to be loaded in the parallel-to-serial converter.

When '1' is set in RTSRC, the value set in the 'RTIME counter' is used as data to be loaded in the parallel-to-serial converter.

(2) RTINCDEC (bit 6) [W]

RTINCDEC specifies whether the 'RTIME counter' performs incrementing or decrementing.

When '0' is set in RTINCDEC, the 'RTIME counter' performs incrementing (The minimum value of the value set in the 'RTIME counter' is '00:00:00', and, when the minimum value is decremented '−1', the resulting value is kept as '00:00:00'.

When '1' is set in RTINCDEC, the 'RTIME counter' performs decrementing (The maximum value of the value set in the 'RTIME counter' is '99:59:74', and, when the maximum value is incremented '+1', the resulting value is '00:00:00'.).

(3) ZSRC (bit 5) [W]

ZSRC specifies source data of 'ZERO' to be loaded in the parallel-to-serial interface.

When '0' is set in LOAD, whether '0' or '1' is set in ZSRC, the value set in the 'IZERO counter' is incremented '+1' for each block (every 13.3 ms in the case where the data writing speed is the single speed mode, for example). The maximum value of the value set in the 'IZERO counter' is '09', and the result of incrementing '+1' the maximum value is '00'.

When '0' is set in ZSRC, the data of 'ZERO' set in the internal register is used as data to be loaded in the parallel-to-serial converter.

When '1' is set in ZSRC, the value set in the 'IZERO counter' is used as data to be loaded in the parallel-to-serial converter.

(4) ATSRC (bit 4) [W]

ATSRC specifies source data of 'AMIN', 'ASEC' and 'AFRM'.

When '0' is set in LOAD, whether '0' or '1' is set in ATSRC, the value set in the 'ATIME counter' is incremented '+1' for each block.

The value of 'ATIME counter' is one of '00:00:00' through '99:59:74' in accordance with setting of ADR.

The result of incrementing '+1' '99:59:74' is '00:00:00'.

When '0' is set in ATSRC, the data of 'AMIN', 'ASEC' and 'AFRM' set in the internal registers is used as data to be loaded in the parallel-to-serial converter.

When '1' is set in ATSRC, the value set in the 'ATIME counter' is used as data to be loaded in the parallel-to-serial converter.

In accordance with setting of ADR (offset 0x0, bits 3–0), data to be loaded in the parallel-to-serial converter is determined as shown in FIG. 9.

(5) LOAD (bit 3) [W]

LOAD specifies loading of initial values of the 'RTIME counter', 'IZERO counter' and 'ATIME counter'.

When '0' is set in LOAD, loading of initial values of the 'RTIME counter', 'IZERO counter' and 'ATIME counter' is not performed (The value of the 'RTIME counter' is incremented '+1' or decremented '−1', the value of the 'IZERO counter' is incremented '+1' and the value of the 'ATIME counter' is incremented '+1', for each block.).

When '1' is set in LOAD, the data at the offsets '0x3 through 0x9' of the subQ command pack is loaded in the 'RTIME counter', 'IZERO counter' and 'ATIME counter', respectively, as the initial values (In this case, each of the settings of RTSRC, ZSRC and ATSRC is caused to be invalid, and the data loaded in the 'RTIME counter', 'IZERO counter' and 'ATIME counter' is used as data to be loaded in the parallel-to-serial converter.) Further, '0x1' is set in 'REPEAT'.

(6) CPYTGL (bit 2) [W]

CPYTGL specifies toggling of a control copy bit (bit 5 of CTL).

When '0' is set in CPYTGL, the data of the control copy bit set in the internal register is used as data to be loaded in the parallel-to-serial converter.

When '1' is set in CPYTGL, the data of 'control copy bit', which toggles for each 4 blocks, is used as data to be loaded in the parallel-to-serial converter (The toggling is started from '1').

FIG. 10 shows the repeat information (REPEAT).

The repeat information is information for setting the number of repetitions of loading data (stored in the internal registers, or stored in the internal registers and set in the internal counters) in the parallel-to-serial converter.

FIG. 11 shows the relationship between the set values of the repeat information and the numbers of repetitions, respectively.

When the number of repetitions of loading data in the parallel-to-serial converter has finished, the subsequent command pack is processed.

FIG. 12 shows the point information (POINT).

The point information is information for setting the front address of the command pack to be processed subsequently. The address for specifying the command pack is data including a total of 24 bits including the more significant 12 bits, calculated as (RingEndPg+1)×0xc00, and the less significant 12 bits, specified as follows:

As shown in FIG. 13, in the above-mentioned less significant 12 bits, the more significant 8 bits are specified by the point information (POINT) and each of the less significant 4 bits is '0x0'.

FIG. 14 shows the subcode P data (SUBP).

In the above-described example of the music CD, described with reference to FIG. 5, the subcode P data indicates a pause provided between adjacent tracks or between the TOC and the first track. In this example, as shown in FIG. 5, the subcode P data is '1' during each pause, and is '0' during the TOC and each track.

Thus, in this controller IC for the CD-R/RW, when data is written in the optical disk, the calculations of monotonically increasing and decreasing the time information and number are repetitively performed by hardware (counters). As a result, the CPU does not need to set the subcode Q data in real time for each block. Thereby, the load of data processing borne by the CUP can be reduced.

Accordingly, high-speed data writing on the optical disk can be performed by a CPU having a low-speed data processing capability.

The controller IC for the CD-R/RW includes the above-mentioned RTIME incrementing/decrementing circuit (RTIME counter), ZERO incrementing circuit (IZERO counter) and ATIME incrementing circuit (ATIME counter). Thereby, the calculations of incrementing/decrementing of the track relative time information (RTIME), ZERO data and through-track absolute time information (ATIME) is performed by the hardware. Accordingly, when the subcode Q data having a simple format of data such as CD-ROM data is written in the optical disk, the CPU merely needs to set the subcode Q data once before writing the data. Thus, it is possible to reduce the number of data settings performed by the CUP.

Further, the controller IC for the CD-R/RW includes the above-described mode control circuit. Thereby, it is possible that the data, which does not need to be updated, of the subcode Q data is output to the parallel-to-serial converter as it is.

A lot of the time information generated by the hardware monotonically increases/decreases and the increasing/decreasing patterns thereof do not need to be updated. Accordingly, the CPU does not need to calculate such time information for every increase/decrease timing.

The controller IC for the CD-R/RW includes the above-mentioned repeat circuit. Thereby, it is possible to determine timing for updating the data of the subcode Q data and the patterns of the gradually increasing/decreasing time information of the subcode Q data.

Thereby, the CPU does not need to generate the interrupt for each block. As a result of reducing of the number of interrupts, the data processing load of the CPU can be reduced.

Further, the controller IC for the CD-R/RW may include the above mentioned double register circuit. Thereby, the CPU merely needs to set the subcode Q data in a time interval (in the example of FIG. 5, minimum 2 seconds) between adjacent points, at each of which the pattern of the subcode Q data changes. As a result, it is possible to elongate the time interval, through continuous blocks, within which the CPU should set the subcode Q data.

Accordingly, when data is written in the optical disk at high speed, determination of the timing at which the CPU needs to set the subcode Q data is not critical. Thereby, programming can be performed without being limited by the determination of the timing at which the CPU needs to set the subcode Q data. As a result, programming can be performed using a CPU having a low-speed data processing capability.

Further, the controller IC for the CD-R/RW may include the above-mentioned subcode Q data sequencer circuit. Thereby, when the data is written on the optical disk, the subcode Q data, previously developed in the buffer RAM by the CPU, can be arbitrarily set.

Accordingly, when a complicated pattern of data such as the TOC is written on the optical disk, even if only one pattern of subcode Q data can be set in the Sys Con register, the CPU does not need to set the data in real time for each block when the data is written on the optical disk as a result of previously setting the pattern of data in the buffer RAM. Thereby, the data processing load of the CPU is reduced.

Further, in the controller IC for the CD-R/RW, without providing a SRAM or a FIFO as a special storage area for the subcode Q data in the IC, the area of the silicon chip of the controller IC for the CD-R/RW can be reduced, by using a portion of the storage area of the buffer RAM for processing host data such as an inexpensive DRAM. Thereby, it is possible to provide an inexpensive IC.

Thus, in the optical disk writing control device according to the present invention, when the subcode Q data is written on an optical disk such as a CD-R, a CD-RW or the like, the number of settings of the main data of the subcode Q data by the CPU can be reduced. Thereby, the data processing load of the CPU is reduced.

Accordingly, it is possible to perform writing data on the optical disk at high speed using an inexpensive CPU having a low-speed data processing capability.

Further, the present invention is not limited to the above-described embodiments, and variations and modifications may be made without departing from the scope of the present invention.

What is claimed is:

1. An optical disk writing control device for writing subcode Q data for each block on an optical disk, comprising:
    subcode Q data storing means for storing subcode Q data set by a CPU; and
    control means for reading the subcode Q data from said subcode Q data storing means, performing a predetermined calculation on predetermined data of the subcode Q data for each block, and outputting, for each block, the predetermined data which has undergone the predetermined calculation and remaining data of the subcode Q data.

2. The optical disk writing control device according to claim 1, wherein said control means comprises selecting means for selecting whether the subcode Q data is output as is or is output after the predetermined calculation is performed on the predetermined data of the subcode Q data.

3. The optical disk writing control device according to claim 1, wherein said control means comprises temporary storing means for temporarily storing the subcode Q data read from said subcode Q data storing means, the subcode Q data stored in said temporary storing means being read and output for each block.

4. The optical disk writing control device according to claim 3, wherein said control means further comprises means for determining timing of reading the subcode Q data from said subcode Q data storing means and storing the read subcode Q data in said temporary storing means.

5. The optical disk writing control device according to claim 1, wherein said control unit comprises a temporary register which temporarily stores the subcode Q data read from said subcode Q data register, the subcode Q data stored in said temporary register being read and output for each block.

6. The optical disk writing control device according to claim 5, wherein said control unit has a function of determining timing of reading the subcode Q data from said subcode Q register and storing the read subcode Q data in said temporary register.

7. An optical disk writing control device for writing subcode Q data for each block on an optical disk, comprising:
    subcode Q data storing means for storing subcode Q data set by a CPU; and
    control means for reading the subcode Q data from said subcode Q data storing means, performing a predetermined calculation on predetermined data of the subcode Q data for each block, and outputting, for each block, the predetermined data which has undergone the predetermined calculation and remaining data of the subcode Q data, wherein said control means further comprises:
    track relative time incrementing/decrementing and outputting means for incrementing or decrementing, and outputting track relative time information of the subcode Q data;
    ZERO incrementing means for incrementing and outputting ZERO data of the subcode Q data; and
    through-track absolute time incrementing/decrementing and outputting means for incrementing or decrementing, and outputting through-track absolute time information of the subcode Q data.

8. An optical disk writing control device for writing subcode Q data for each block on an optical disk, comprising:

subcode Q data storing means for storing subcode Q data set by a CPU; and control means for reading the subcode data from said subcode Q data storing means, performing a predetermined calculation on predetermined data of the subcode Q data for each block, and outputting, for each block, the predetermined data which has undergone the predetermined calculation and remaining data of the subcode Q data, wherein said control means further comprises means for storing the subcode Q data, set by said CPU, in an external memory, reading the subcode Q data from said external memory occasionally, and storing the read subcode Q data in said subcode Q data storing means.

9. An optical disk writing control device for writing subcode Q data for each block on an optical disk, comprising:

subcode Q data storing means for storing subcode Q data set by a CPU; and control means for reading the subcode Q data from said subcode Q data storing means, performing a predetermined calculation on predetermined data of the subcode Q data for each block, and outputting, for each block, the predetermined data which has undergone the predetermined calculation and remaining data of the subcode Q data wherein said control means further comprises means for storing the subcode Q data, set by said CPU, in an external memory, reading the subcode Q data from said external memory occasionally, and storing the read subcode Q data in said subcode Q data storing means, wherein a portion of a buffer RAM for host data is used as said external memory.

10. An optical disk writing control device for writing subcode Q data for each block on an optical disk, comprising:

temporary storing means for temporarily storing the subcode Q data set by a CPU; and control means for reading the subcode Q data from said temporary storing means and outputting the read subcode Q data, for each block.

11. An optical disk writing control device for writing subcode Q data for each block on an optical disk, comprising:

a subcode Q data register which stores subcode Q data set by a CPU; and a control unit which reads the subcode Q data from said subcode Q register, performs a predetermined calculation on predetermined data of the subcode Q data for each block, and outputs, for each block, the predetermined data which has undergone the predetermined calculation and remaining data of the subcode Q data.

12. The optical disk writing control device according to claim 11, wherein said control unit has a function of selecting whether the subcode Q data is output as is or is output after the predetermined calculation is performed on the predetermined data of the subcode Q data.

13. An optical disk writing control device for writing subcode Q data for each block on an optical disk, comprising:

a subcode Q data register which stores subcode Q data set by a CPU; and a control unit which reads the subcode Q data from said subcode Q register, performs a predetermined calculation on predetermined data of the subcode Q data for each block, and outputs for each block, the predetermined data which has undergone the predetermined calculation and remaining data of the subcode Q data, wherein said control unit further comprises:

a track relative time counter which increments or decrements, and outputs track relative time information of the subcode Q data;

a ZERO counter which increments and outputs ZERO data of the subcode Q data; and a through-track absolute time counter which increments or decrements, and outputs through-track absolute time information of the subcode Q data.

14. An optical disk writing control device for writing subcode Q data for each block on an optical disk, comprising:

a subcode Q data register which stores subcode Q data set by a CPU; and a control unit which reads the subcode Q data from said subcode Q register, performs a predetermined calculation on predetermined data of the subcode Q data for each block, and outputs, for each block, the predetermined data which has undergone the predetermined calculation and remaining data of the subcode Q data, wherein said control unit has functions of storing the subcode Q data, set by said CPU, in an external memory, reading the subcode Q data from said external memory occasionally, and storing the read subcode Q data in said subcode Q data register.

15. The optical disk writing control device according to claim 14, wherein a portion of a buffer RAM for host data is used as said external memory.

16. An optical disk writing control device for writing subcode Q data for each block on an optical disk, comprising:

a register which temporarily stores the subcode Q data set by a CPU; and a control unit which reads the subcode Q data from said register and outputs the thus-read subcode Q data, for each block.

* * * * *